Patented Oct. 8, 1929

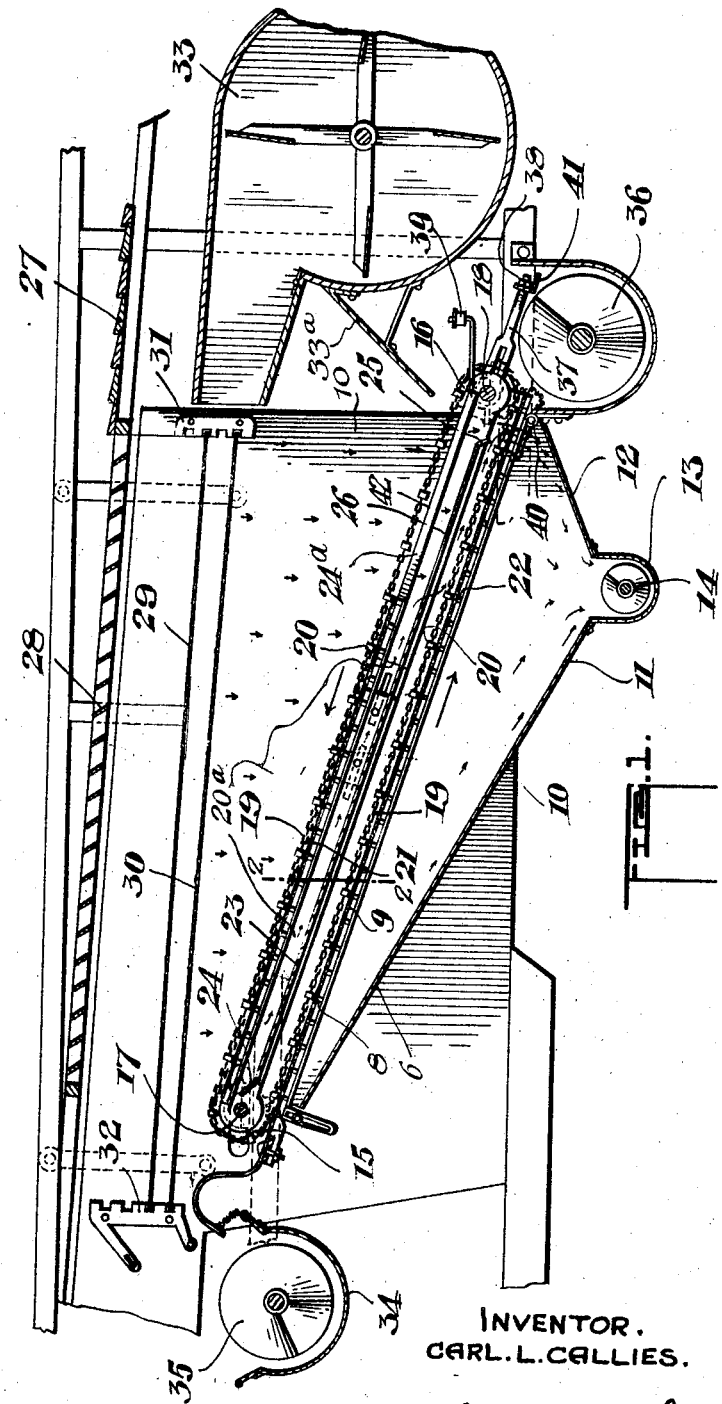

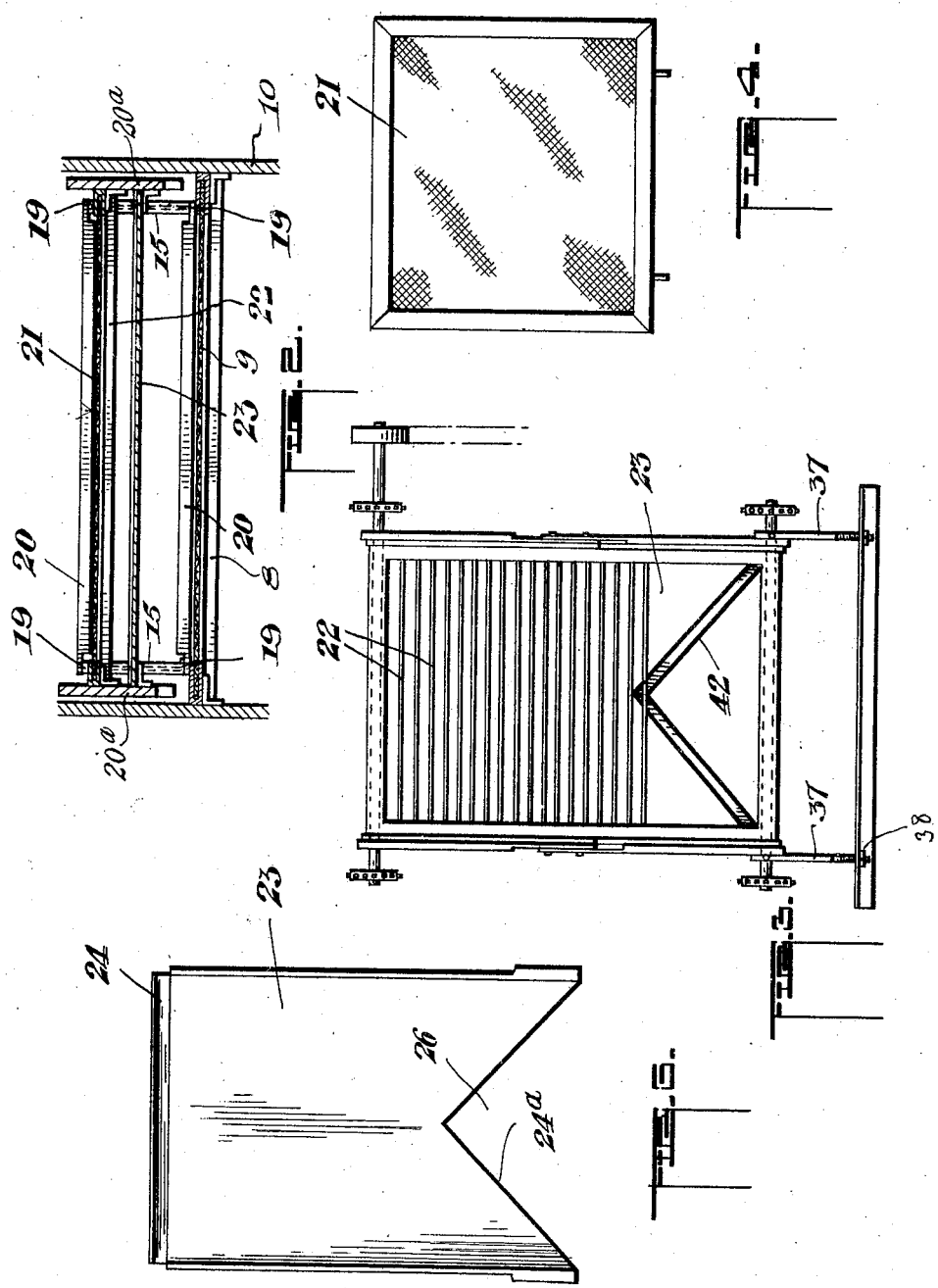

1,730,556

UNITED STATES PATENT OFFICE

CARL LOUIS CALLIES, OF WETASKIWIN, ALBERTA, CANADA

GRAIN CLEANER

Application filed February 5, 1927. Serial No. 166,151.

This invention relates to improvements in grain cleaners, and one object of the invention is to provide a simply and durably constructed machine of this description for cleaning grain, consisting of comparatively few parts and which can be manufactured and placed on the market at a reasonable price.

With this and other objects hereinafter referred to the invention consists essentially in the novel construction and combination of parts described in the present specification and indicated in the accompanying drawings.

Referring to the drawings in which like numerals of reference indicate corresponding parts in each figure.

Figure 1 is a longitudinal section of the cleaner.

Figure 2 is a cross section on the line 2—2 Fig. 1.

Figure 3 is a detail plan view of the upper grate, with the carrier and screen removed.

Figure 4 is a detail of the screen, and

Figure 5 is a detail plan view of the pan.

Referring more particularly to the drawings, A indicates the device as a whole composed of a suitable thresher framework, 10 indicates a vibratory shoe mounted to vibrate on the framework and constructed of any suitable shape and preferably, as shown in Figure 1, with a base slanting in opposite directions as at 11 and 12 to form a grain receiving pan 6 and communicating with a grain discharge 13 in which is an auger 14. At opposite ends of the framework are mounted sprocket wheels 15 and 16 on rotatable transversely extending shafts 17 and 18. On these sprockets and rotatable therewith is an endless carrier comprising an endless chain 19 having at spaced intervals thereon slats 20. Beneath the carrier is a frame 20ª loosely supported on the shafts 17 and 18 and in which is fastened a stationary screen 21. Beneath this screen is a mounted stationary grate 22 fastened to the frame 20ª while registering with this grate and in spaced relationship thereto is a pan 23 also fastened to the frame 20ª. The stationary screen 21 and seed pan 23 constitute what is known as the upper screening unit. The pan 23 is upwardly turned at one end, as at 24, and formed at the other end with an inwardly cut, V-shaped end portion at the other end as at 24ª, extending downwardly at the extreme end as at 25 a space 26 being therefore provided for the grain to pass through to the lower screen as indicated by the arrows in Figure 1, hereinafter referred to. The lower screening unit comprises a screen 9 fastened to the shoe 10 of the machine and moving longitudinally therewith positioned directly below the grate 22, and upper seed pan 23, and extending below the grain passage or space 26 in the pan 23. A grate 8 is also provided beneath the screen 9, similarly to the upper screening unit, and it will be seen that the carrier is designed to pass over the lower screen 9 in addition to the upper screen. It should here be mentioned that the grate 8 of the lower unit is fastened to the shoe, and that the seed or grain receiving pan beneath the lower screen is also fastened to the shoe, so that on the machine being operated, longitudinal vibratory movement is imparted automatically through the shoe to the screen 9, grate 8 and pan 6.

The grain is supplied into the top of the casing in any well known manner, by means of a grain deck 27 and chaffer 28, while between the latter and the screening units are spaced sieves 29 and 30, adjustably mounted in suitable brackets 31 and 32. In connection with the chaffer, a blower 33 of well known construction is used; also in combination therewith, a grain lead 33ª to direct the flow of grain downwardly to the screening unit. The dust and foreign material not cleared by the chaffer, passes out of the machine into the member 34, in which is an auger 35, while at the other end of the machine is a grain auger 36.

A carrier tightener 37 drawn by a nut 38 is provided with a hand oiler as indicated by the numeral 39, while the frame 20ª is constructed in sections adjustably secured together by a slot and pin engagement in order to provide for longitudinal lengthening thereof. For adjusting the sieve and the grate and if necessary to remove both, I provide a hinge 40. An angle casting 41 is also fastened to the thresher framework to hold the carrier tightener. It might be here stated that the upper grate is formed at one end thereof in a plate-like structure which is provided with a V-shaped opening therein 42 which is designed to perform the function of a seed lead and register with the V-shaped opening formed as at 24ª in the seed pan 23 whereby grain may pass down through the opening 42 and the opening 24ª of the seed pan to reach the lower screen 9.

In operation, grain is supplied from the grain deck 27 to the chaffer and from thence the seed is dropped to the space sieves 29 and 30 passing then to the upper screening unit. The blower 33 blows the dust and foreign particles towards the other end of the machine and, of course, the finer grain is also affected somewhat by the air current to drop on the upper portion of the upper screening unit. The carrier 19 is set into motion and, travelling over the upper screen, assists in screening the grain through to the seed pan 23, the finer grain reaching the pan 23, and the coarser grain which will not screen through is carried along with the carrier to the second screen 8 where, in combination with the vibratory motion, which is imparted to the screen 8 through its connection with the vibratory shoe 10, the grain is given a more thorough screening. Grain from the upper pan passes down through the space 26 and to the lower screen 9 where it passes through to the pan 6, and the finer grain from the lower screen also passes through to the pan 6. The grain which is not screened through the lower screen and which is carried by the carrier is deposited into the grain screw 36 and carried to its final destination, the grain from the pan 6 being carried to its destination through the grain discharge 13 by screw 14. As above stated, the grain, on leaving the space sieves 29 and 30, passes to the top screening unit and the lighter grain depositing on the upper end of the screen and the heavier grain depositing in the lower regions of the screen, while, through the virtue of the opening 42 in the upper grate, the heavier grain which reaches the lower extremities of the upper screening unit passes down through said opening and through the space 26 to the lower screen 9 to pass therethrough if fine enough or to be immediately carried by the carrier to the grain auger 36. The grain lead 33ª of course directs any stray grain which possibly reaches the end of the machine back onto the screens and the auger 35 at the other end of the machine receives and carries away the dust and foreign material not cleared by the chaffer.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A grain cleaner of the character described comprising in combination with a vibratory shoe, a stationary frame mounted inside the shoe, an upper screening unit consisting of a stationary screen, a grate beneath the screen and a pan beneath the grate mounted in the shoe and carried by the stationary framework, a lower screening unit consisting of a movable screen and a movable grate beneath the screen secured to the vibratory shoe, an endless carrier operatively mounted in the shoe adapted to pass over the screens of both screening units, and a grain receiving pan below the lower screening unit for receiving and discharging the treated grain.

2. A grain cleaner of the character described comprising in combination with a vibratory shoe, a stationary framework mounted in the shoe, upper and lower screening units mounted in the shoe, the upper unit including a stationary screen, grate and grain pan carried by the framework, an endless carrier adapted to move over the upper screen and over the lower screen of the lower screening unit, said lower screening unit being secured to the shoe and movable therewith, a grain receiving pan below the lower screening unit for receiving and discharging screened grain and a second grain receiving member at the end of the lower screening unit.

3. A grain cleaner of the character described comprising in combination with a vibratory shoe, a stationary framework mounted within the shoe, grain screening means mounted in the shoe comprising an upper screening unit composed of a stationary screen, grate and pan mounted on the framework and a lower screening unit composed of a movable screen, grate and pan, said lower screen and grate being secured to the shoe, an endless carrier common to both screens and adapted to move thereover for screening the grain, a direct grain lead formed in the grate and pan of the upper screening unit, means for conveying away the screened grain and conveying means for the separated dust and foreign material.

4. A device as claimed in claim 3 in which means is provided for tightening the carrier and in which the stationary frame may be longitudinally lengthened.

In witnes whereof I have hereunto set my hand.

CARL LOUIS CALLIES.